June 18, 1946.  K. C. D. HICKMAN  2,402,402
APPARATUS AND PORCESS FOR PRODUCING FOG OR SMOKE
Filed Nov. 16, 1942  2 Sheets-Sheet 1

KENNETH C. D. HICKMAN
INVENTOR
BY
ATTORNEYS

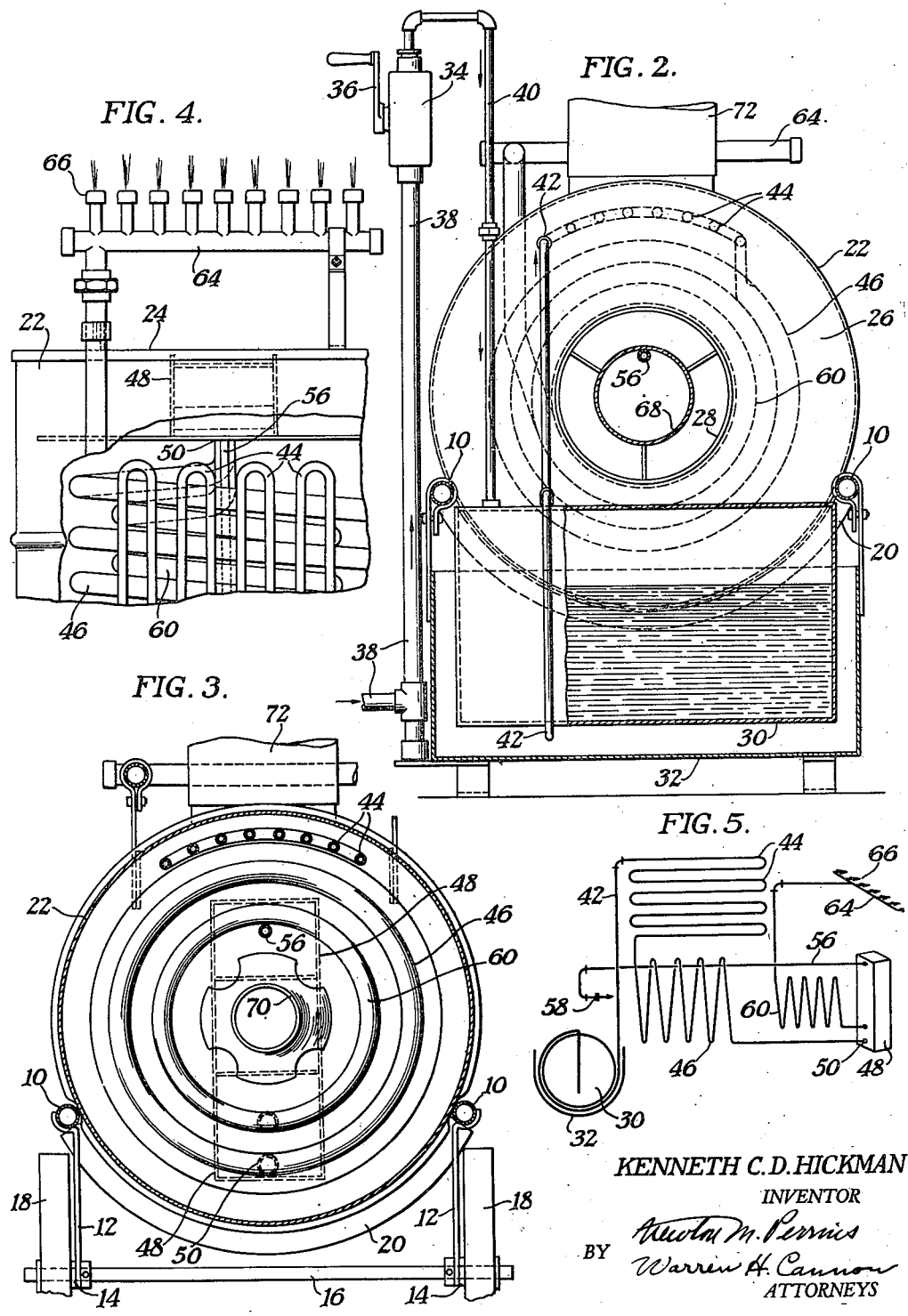

Patented June 18, 1946

2,402,402

UNITED STATES PATENT OFFICE 2,402,402

APPARATUS AND PROCESS FOR PRODUCING FOG OR SMOKE

Kenneth C. D. Hickman, Rochester, N. Y., assignor to Distillation Products, Inc., Rochester, N. Y., a corporation of Delaware Application November 16, 1942, Serial No. 465,798

12 Claims. (Cl. 43—129)

This invention relates to improved procedure for producing fog or smoke, particularly for military and agricultural purposes, and apparatus for practicing such process.

It has been previously known that fog or smoke for military of agricultural purposes could be produced by vaporizing a fog-producing material and introducing the vapors into the atmosphere. However, the equipment used for such purposes has been complicated, heavy and expensive and, therefore, not completely satisfactory for military use; in particular the equipment has not been of a nature such that it could be readily and quickly transported to the place of use. Also, it has been dependent in many cases upon sources of electrical energy for operation.

This invention has for its object to overcome the above noted difficulties. Another object is to provide improved procedure and apparatus for producing fog or smoke for military, naval, agricultural and fumigation purposes. A further object is to provide simplified procedure and apparatus for producing fog or smoke. Other objects will appear hereinafter.

These and other objects are accomplished by my invention which includes heating a substance serving both as a fuel and as a source of opaque vapor to a temperature sufficient to partially convert it into vapors, separating the vaporized portion from the unvaporized portion, igniting the unvaporized portion and utilizing the heat of combustion to vaporize the originally unvaporized portion, the last produced vapors being introduced into the atmosphere to form fog or smoke.

Although vapors are generally transparent and the fog droplets formed by condensation of the vapors are likewise individually transparent it is known that they act to form a body of fog or smoke due to their high scattering and reflecting power. It is therefore to be understood that the term "opaque vapor" as used herein is intended to designate vapors, particles or droplets which have the property when dispersed in the atmosphere of forming fog or smoke.

In the following examples and description I have given several of the preferred embodiments of my invention. However, it is to be understood that these are set forth for the purpose of illustration and not in limitation thereof.

In the accompanying drawings I have illustrated one of the preferred embodiments of my invention wherein:

Fig. 2 is an end view partly in section taken on line 2—2 of Fig. 1;

Fig. 3 is a vertical transverse section taken on line 3—3 of Fig. 1;

Fig. 4 is a fragmentary top plan view of the right hand end of the apparatus illustrated in Fig. 1, and Fig. 5 is a diagrammatic flow sheet indicating the course of the smoke of fog-producing material and the combustible material through the apparatus.

Figure 1:
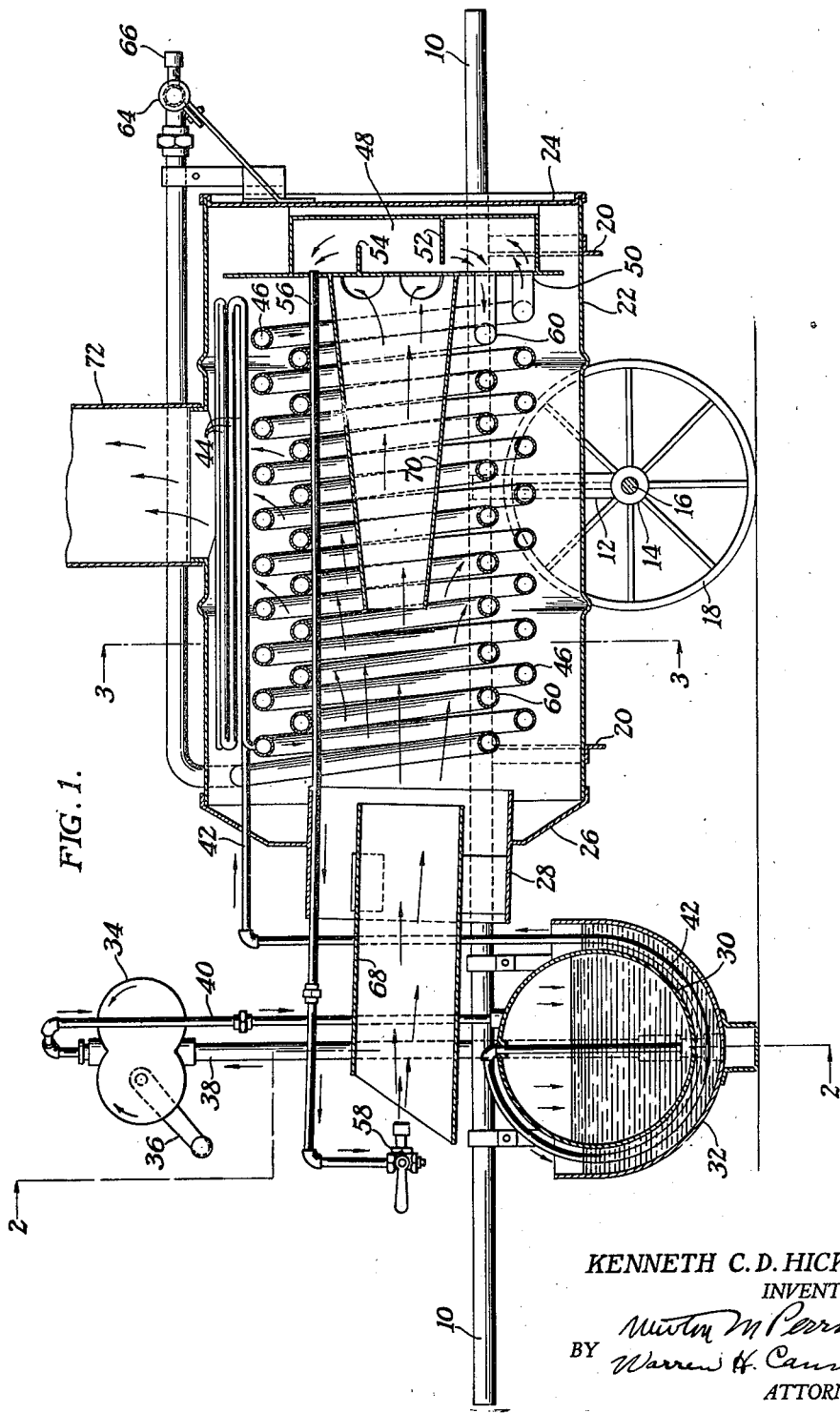
Fig. 1 is a longitudinal vertical section of a self-contained smoke or fog-producing apparatus.

Referring to Figs. 1 to 4, numeral 10 designates two substantially horizontal pipes or conduits forming a frame to which are rigidly fixed extensions 12, the lower ends of which carry bearings 14 for axle 16. Upon axle 16 are mounted wheels 18. It will be noted that pipes 10 and wheels 18 serve to make the apparatus readily transportable in the manner of a wheel barrow, the conduits 10 serving as handles. Numeral 20 designates a plurality of arc-shaped cradles mounted between conduits 10 in which rests a circular drum 22 which may be an ordinary 55-gallon drum readily available on the market. The drum is closed at one end by plate 24 and at the other end is provided with a cap 26 the central portion of which is open and provided with an integral collar 28. Numeral 30 designates a reservoir for operating material which is suspended on the frame 10 and positioned within a water filled cooling jacket 32, which is similarly mounted on the frame or pipes 10. Numeral 34 designates a hand pump of a gear type provided with a hand crank 36.

Numeral 38 indicates a conduit leading to the intake side of pump 34. Numeral 40 indicates a conduit leading from the exit side of pump 34 to the inside of reservoir 30. Numeral 42 designates a conduit beginning at the lower inside portion of reservoir 30 and leading into the upper inside portion of drum 22, where it forms a plurality of horizontal U-shaped coils 44. Conduit 44 then connects to a spiral shaped conduit 46 which terminates in a vapor separation chamber 48 at the point indicated by numeral 50.

Separation chamber 48 is a closed elongated chamber provided with a plurality of baffles 52 and 54. The upper part of the separation chamber leads to a conduit 56 which terminates in burner 58. The lower portion of the separation chamber is connected to a spiral conduit 60 located inside the spiral conduit 46 and approximately coaxial therewith. Spiral shaped conduit 60 is led outside the drum 22 and terminates in a header 64 provided with a plurality of nozzles 66 which are open to the atmosphere. Numeral 68 designates a baffle surrounding the flame emitted from burner 58 and serving to direct it into the central portion of drum 22. Numeral 70 designates a baffle positioned centrally within the drum 22 and serving to direct the hot gases toward the coils 46 and 60. Numeral 72 designates a chimney for the spent gases of combustion.

In operating the apparatus the equipment is transported to the place of operation together with a source of combustible substance and an opaque vapor-producing substance. An example of an opaque vapor-producing substance is a hydrocarbon in the lubricating oil range. An example of a high vapor pressure combustible substance is kerosene. These two materials are mixed and the source of the mixture, such as a large drum, is connected to the intake 38 of hand pump 34. The mixture is pumped into reservoir 30 to the approximate height indicated. A small amount of kerosene is introduced into the inside of drum 22 so that it rests in a pool on the bottom thereof. This kerosene is ignited. Air is then pumped into reservoir 30 through a suitable valve to form a pneumatic head therein. This causes the mixture of oil and kerosene to flow through conduit 42 and continuations 44 and 46. The mixture becomes heated to a temperature sufficient to vaporize a portion of the kerosene and the vapors and liquid portion of the mixture flow into the lower part of separating chamber 48.

In separating chamber 48 the vapors pass to the top into conduit 56 and through burner 58. These vapors are ignited at the burner and the hot flame is ejected into the central portion of the drum 22. The baffles, 68 and 70, serve to direct the flame against the spiral conduits 46 and 60 to give efficient heating. The liquid portion separated in separating chamber 48 flows through spiral coil 60 where it is heated to above vaporization temperature, and these vapors then pass to header 64 and are ejected into the atmosphere through nozzles 66 to form a dense fog or smoke.

The kerosene introduced into the inside lower portion of drum 22 merely serves to start the apparatus. Its function is served as soon as vapors have been produced and ignited at burner 58. The operation of the apparatus is then automatic as long as liquid is supplied to reservoir 30.

A pressure of about 10 to 20 lbs. of air in reservoir 30 is sufficient to cause the contents to flow through the heating coils at a suitable rate. The pressure may be somewhat lower when the apparatus is first started, in which case the pressure of the vapors produced in the coils will cause some of the liquid to flow backward into the reservoir 30 raising its pressure slightly. This increase in pressure is then a sign that vapors have been produced and can be used as an indication as to when burner 58 should be opened and ignited. The pressure then preferably should be increased in reservoir 30 by pumping in air so as to give a satisfactory rate of flow of liquid into the heating coils.

While the foregoing quite clearly indicates the flow of liquid mixture through the apparatus, Fig. 5 makes this clear at a glance. The conduit 42 leads to the series of U-shaped coils 44, and thence to spiral coil 46 which terminates in separating chamber 48. The vapor portion passes through conduit 56 to burner 58 and the liquid portion passes through coil 60 to header 46 and ejecting nozzles 66.

Numerous materials can be used as a source of the relatively high vapor pressure combustible substance but I prefer to use hydrocarbon fractions such as kerosene and gasoline, and in some cases lighter forms of fuel oil because of their cheapness and availability. Similarly a wide variety of materials can be used as a source of opaque vapor. I prefer for the reasons indicated to utilize a lower vapor pressure hydrocarbon for this purpose. However, other opaque vapor-producing materials are known in the art such as high molecular weight fatty acids, and such materials may be used, if desired. In connection with the use of the mixture of kerosene and lubricating oils, I have found that up to about 60% kerosene may be used. However, I prefer to use between 5 and 50% kerosene and particularly between 15 and 30% kerosene. With this mixture the color of the smoke or fog can be regulated by the amount of kerosene used. The color of the smoke or fog, of course, indicates the size of the fog particles. Specific examples of mixtures found to be satisfactory are 30 gallons of lubricating oil of the 20 W grade mixed with 10 gallons of kerosene; also, 25 gallons of spent lubricating oil from an automobile crank case can be mixed with 10 gallons of kerosene and permitted to settle. The supernatant liquid is decanted from the sludge deposit and is employed in the manner indicated.

While such mixtures have advantages I have found that other materials may be used which are not formed by mixing and which in some cases are made up of a single or plurality of similar components. Thus a satisfactory source of both combustible substance and opaque vapor would be a wide distillation cut from an oil refinery still. Also, a heavy oil could be heated to partial cracking temperature, the cracked vapors separated and used as fuel to vaporize the uncracked portion.

Fogs or smokes have been utilized previously to kill insects, rodents, bacteria, and other forms of animal life. My invention is applicable to such uses. Thus, the hydrocarbon smoke or fog is in many cases an insecticide in and of itself. On the other hand, a substance having a harmful action on the animal organism may be mixed with the source of fog or smoke and vaporized therewith in the manner indicated. Thus, two parts of gasoline may be mixed with five parts of number 2 fuel oil and one part of rotenone or extract of derris root. This mixture is passed through the machine and the rotenone is vaporized with the fog-producing material, i. e., the fuel oil, and is conveyed to crops to kill insects thereon.

What I claim is:

1. The method of producing fog or smoke which comprises heating an organic material, serving as a fuel and as a source of opaque vapor, to a temperature sufficient to partially convert it into vapors, separating the vaporized from the unvaporized portion, igniting the vaporized portion, utilizing the heat of combustion to vaporize the originally unvaporized portion and introducing these vapors into the atmosphere.

2. The method of producing fog or smoke which comprises heating a hydrocarbon, serving both as a fuel and as a source of opaque vapor, to a temperature sufficient to partially convert it into vapors, separating the vaporized from the unvaporized portion of the hydrocarbon, igniting the vaporized portion, utilizing the heat of combustion to vaporize the originally unvaporized portion of the hydrocarbon, and introducing the vapors thus produced into the atmosphere.

3. The method of producing fog or smoke which comprises heating a relatively heavy hydrocarbon to a temperature sufficient to partially convert it into vapors by cracking, separating the cracked vapors from the unvaporized portion, igniting the cracked vapors, utilizing the heat of combustion to vaporize the originally unvaporized portion, and introducing these vapors into the atmosphere.

4. The method of producing smoke or fog which comprises heating a mixture of an opaque vapor-producing substance and a combustible substance having a higher vapor pressure than the opaque vapor-producing substance, to a temperature sufficient to convert at least part of the combustible substance into vapors but insufficient to vaporize a substantial portion of the opaque vapor-producing substance, separating the vapors from the unvaporized portion, igniting the vapors of combustible substance, utilizing the heat of combustion to vaporize the opaque vapor-producing substance, and introducing the vapors thus produced into the atmosphere.

5. The method of destroying harmful animal organisms which comprises heating a mixture of an opaque vapor-producing substance, a substance having a harmful effect on animal life, and a combustible substance having a higher vapor pressure than the harmful substance and the opaque vapor-producing substance, to a temperature sufficient to convert much of the combustible substance into vapors but insufficient to vaporize a substantial portion of the opaque vapor-producing substance and the substance harmful to animal life, separating the vapors from the unvaporized portion, igniting the vapors of combustible substance, utilizing the heat of combustion to vaporize the opaque vapor-producing substance and the substance harmful to animal life, and introducing the vapors thus produced into contact with the animal to be destroyed.

6. The method of producing smoke or fog which comprises heating a mixture of an opaque vapor-producing hydrocarbon with a combustible hydrocarbon having a substantially higher vapor pressure than the opaque vapor-producing hydrocarbon, to a temperature sufficient to convert most of the high vapor pressure combustible hydrocarbon into vapors but insufficient to vaporize a substantial portion of the opaque vapor-producing hydrocarbon, separating the vapors thus produced, igniting the vapors, utilizing the heat of combustion to vaporize the opaque vapor-producing hydrocarbon, and introducing the hydrocarbon vapors thus produced into the atmosphere.

7. The method of producing smoke or fog which comprises heating a mixture of mineral lubricating oil and kerosene to a temperature sufficient to convert most of the kerosene into vapors but insufficient to vaporize a substantial portion of the lubricating oil, separating the kerosene vapors from the unvaporized lubricating oil, igniting the kerosene vapors, utilizing the heat of combustion to vaporize the lubricating oil and introducing the vapors thus produced into the atmosphere.

8. The method of producing smoke or fog which comprises heating a mixture of mineral lubricating oil and about 5 to 50% kerosene, to a temperature sufficient to convert the kerosene into vapors but insufficient to vaporize a substantial portion of the lubricating oil, separating the kerosene vapors from the unvaporized lubricating oil, igniting the vapors of the kerosene, utilizing the heat of combustion to vaporize the lubricating oil, and introducing the vapors thus produced into the atmosphere.

9. The method of producing smoke or fog which comprises heating a mixture of light mineral lubricating oil and 5 to 50% kerosene to a temperature sufficient to convert most of the kerosene into vapors but insufficient to vaporize a substantial portion of the lubricating oil, separating the vapors of kerosene from the unvaporized lubricating oil, igniting the vapors of kerosene, utilizing the heat of combustion to vaporize the lubricating oil and introducing the vapors thus produced into the atmosphere.

10. In a machine for producing smoke or fog, a conduit open to the atmosphere at one end, means for introducing a liquid under pressure into the conduit at a remote point from the end open to the atmosphere, means for heating the conduit, means positioned intermediate the open end of the conduit and the point of introduction of liquid, for separating the introduced liquid into a liquid portion and a vapor portion, and means for conveying the separated vapors to the heating means for combustion.

11. In a machine for producing smoke or fog, a reservoir for liquid, means for maintaining the liquid in the reservoir under pneumatic pressure, a substantially spiral shaped conduit one end of which terminates in the lower portion of the reservoir and the other end of which exhausts into the atmosphere, heating means adapted to burn combustible vapors positioned so that the heat of combustion is directed toward the center of the spiral conduit, means positioned at an intermediate point of the conduit for separating liquid and vapor portions of the contents of the conduit and means for conveying the vapor portion to the heating means.

12. In a machine for producing smoke or fog, a conduit open to the atmosphere at one end, means for introducing a liquid under pressure into the conduit at a remote point from the end open to the atmosphere, means for heating the conduit, means connected to the conduit at an intermediate point for separating vapors and liquid, means for conveying vapors thus separated to the heating means for combustion, and means for introducing the separated liquid into the portion of the conduit situated between the separating means and the end open to the atmosphere.

KENNETH C. D. HICKMAN.